United States Patent [19]
Kubo et al.

[11] Patent Number: 4,687,300
[45] Date of Patent: Aug. 18, 1987

[54] LIQUID CRYSTAL DISPLAY DEVICE

[75] Inventors: Kiichirou Kubo; Mikio Kanazaki, both of Mobara, Japan

[73] Assignee: Hitachi, Ltd., Tokyo, Japan

[21] Appl. No.: 795,454

[22] Filed: Nov. 6, 1985

[30] Foreign Application Priority Data

Nov. 9, 1984 [JP] Japan ............................. 59-234901
Jan. 28, 1985 [JP] Japan ............................. 60-12382

[51] Int. Cl.$^4$ ............................................. G02F 1/133
[52] U.S. Cl. ..................................... 350/336; 350/334; 340/765; 377/55; 377/114; 439/68
[58] Field of Search ............. 350/334, 336; 340/765; 377/55, 114; 339/17 LM

[56] References Cited

U.S. PATENT DOCUMENTS

| | | | |
|---|---|---|---|
| 3,928,658 | 12/1975 | Van Boxtel et al. | 350/336 |
| 4,188,626 | 2/1980 | Frantz et al. | 350/336 |
| 4,277,784 | 7/1981 | Hyltin | 340/765 |
| 4,629,289 | 12/1986 | Streit | 350/336 |

Primary Examiner—John K. Corbin
Assistant Examiner—Martin Lerner
Attorney, Agent, or Firm—Antonelli, Terry & Wands

[57] ABSTRACT

A liquid crystal display device comprises first and second substrates coated on the inner surfaces thereof with electrodes, at least one of said first and second substrates including an extended portion thereof with projects beyond the edge of the other of said substrates, a sealing member disposed around the periphery enclosing liquid crystal material and sealing between the substrates, input conductors disposed on the inner surface of said extended portion and electrically connected to said electrodes, a plurality of driving integrated circuit chips mounted on the inner surface of said extended portion and electrically connected to said input conductors, including a plurality of pairs of input terminals thereof electrically connected, one input terminal constituting each pair is arranged in the reverse order on one side of a reference line with respect to the other constituting the pair on the other side of a reference line, metal film conductor formed on the inner surface of said extended portion and connecting said corresponding input terminals of said adjacent chips, a plurality of external contact terminals to an external apparatus, formed on the inner surface of said extended portion and electrically connected to input terminals of said chip.

5 Claims, 9 Drawing Figures

LIQUID CRYSTAL DISPLAY DEVICE

BACKGROUND OF THE INVENTION

The present invention relates to a liquid crystal display device and more particularly to such a device which facilitates electrical connections between a plurality of integrated circuit chips mounted on the substrate thereof.

In recent years, "Chip on Glass" technology has been studies in order to reduce the size of display devices, increase display content, and improve reliability as described in "Chip on Glass" Technology for Large Scale Automotive Dsiplays", Electronic Displays and Informtion Systems, SP-565, International Congress & Exposition, Detroit, Mich. February 27-March 2, '84. By the chip on glass technology, integrated circuits are bonded in chip from directly on a glass substrate of a liquid crystal display device for example.

As display content increases, the number of segment electrodes and as a result often that of integrated circuits for driving of segment electrodes. A standard car display requires 8 to 10 IC's for driver IC's, a microcomputer, and others. When a plurality of integrated circuit chips are mounted on one surface of a glass substrate, intersections of electrical wiring are often unavoidable, and multilayer wiring which uses two conductor planes separated by a dielectric layer, or crossover connections have been used. With regard to cost alone, the crossover connections are preferred to multilayer wiring which needs printing, deposition by evaporation or sputtering of several layers, therefore the crossover connections will be explained below.

FIG. 1 shows an exploded view of an example of twisted nematic type (TN type) liquid crystal display devices which are among the field-effect type liquid crystal display devices. The liquid crystal display device shown in FIG. 1 comprises a first substrate 1 and a second substrate 2 both of which are made of transparent glass or other like material and arranged substantially parallel to each other with a predetermined spacing, for example 5 to 15 um, and sealed at the periphery with a sealing member 3 such as frit glass or an organic adhesive, and a nematic liquid crystal 4 encapsulated therein.

Segment electrodes 5, which are transparent and in the form of segments which can be selectively energized to produce various characters, for each display position $6_1, 6_2, \ldots, 6_n, 6_{n+1}, 6_{n+2}, \ldots, 62_n$ are formed on the inner surface of substrate 2, individual conductors represented by numeral 10 are provided for each of segment electrodes 5, and electrically connected to input conductors 14.

Common electrode 7 which is common to all segment electrodes 5 is formed on the inner surface of substrate 1. In order to facilitate the electrical connections between a liquid crystal display area and driving circuits it is desirable to arrange all input conductors 14 of the liquid crystal display area along the edge of only one of the substrates 1 and 2. Conductor 11 is formed on the inner surface of substrate 1 and electrically connected to common electrode 7, conductor 12 is formed on the inner surface of substrate 2 and connected to input conductor 14. Conductors 11 and 12 are electrically connected via conducting paste, for instrance, silver paste 13 disposed between substrates 1 and 2.

The inner surfaces of substrates 1 and 2 which contact liquid crystal 4 are worked into liquid crystal controlling planes 8 and 9 where the liquid crystal molecules in the vicinity of these planes are oriented in a given direction. Such orientation controlling plans can be formed by coating the electrode-carrying side of each substrate with an oblique vacuum evaporateion of film of SiO, or by coating the electrodecarrying side of each substrate with an organic highmolecular film or a film of an inorganic material and rubbing the coated surface in a given direction with cotton or other means.

Substrates 1 and 2 secured together by a sealing member 3 are sandwiched between a pair of polarizers (not shown). A twisted nematic type liquid crystal display device is explained in more detail in U.S. Pat. Nos. 3,731,986 and 3,918,796 to J. L. Fergason. In FIG. 1 the surface of substrate 2 is larger than that of substrate 1.

Driving integrated circuit chips 16 and 17 for a liquid crystal display area are mounted on projecting edge 15. Driving integrated circuit chip 16 is for driving of dipslay positions $6_1, 6_2, \ldots, 6_n$ and driving integrated circuit chip 17 is for driving of display pisitions $6_{n+1}, 6_{n+2}, \ldots, 62_n$.

External contact terminals 18 are also formed on projecting edge 15 and electrically connected in common to driving integrated circiuit chips 16 and 17.

The common signals such as power supply, data signal, clock signal and address signal (chip select), etc. must be input to the driving integrated circuit chips 16 and 17 through the external contact terminals 18, and therefore the crossover connections are generated in the wirings. This relation is shown in FIG. 2. The substrate 2 mounting the driving integrated circuit chips 16 and 17 is usually made of glass and therefore it is difficult from the technical point of view to form the wiring pattern at the rear side of substrate 2 by forming the through hole. Accordingly, the multilayer wiring or crossover connections are usually employed for the intersections of wirings as explained above. Also, from the economical point of view, the crossover connections have been preferred. FIG. 1 shows an example where the crossover ocnnections are employed for the intersections of wirings.

The wirings between the external contact temrinals 18 and driving integrated circuit chip 16 are made by the wiring conductors 19 through metal coating formed on the substrate 2. This metal coating preferably comprises a vapor depositon four layer structure of chromium/nickel/copper/chromium. On the other hand, the wirings between external contact terminals 18 and the driving integrated circuit chip 17 are electrically connected to the one ends of crossover conductors 21 formred at the inner surface of substrate 1 by the conducting paste, for example, silver paste 20 disposed between the substrates 1 and 2 electrically connected in the course of the wiring conductors 19. These crossover conductors 21 are disposed bridging over the wiring conductors 19 at a different level. The conducting paste 22 is disposed at an area on the inner surface of substrate 2 corresponding to the other ends of the crossover conductors 21. These elements and the driving integrated circuit chip 17 are electrically wire-connected through the wiring conductors made of multilayer metal film 23 (wiring conductors 19 and 23 has the four layer structure of Cu-Ni-Cu-Cr in the same configuration).

However, such structure provides such a disadvantage that the contact resistances among conducting pastes 20 and 22, wiring conductors 19 and 23 and crossover conductors 21 do not become sufficiently low and in case a plurality of chips are mounted like the liquid crystal display device for display with a large number of digits or gaphic display, blur in display or delay of data transmission timing is generated. Moreover, electrical contact by conducting paste is not stable and such crossover connections are inferior from the point of view of space saving.

SUMMARY OF THE INVENTION

An object of the present invention is to provide a liquid crystal display device free from the blurs in display, delay in timing of data transfer, and malfunction due to the electrical resistance of wiring connected to dividing integrated circuit chips mounted on the substrate of the liquid crystal display device.

Another object of the present invention is to provide a compact and highly reliable liquid crystal display device with driving integrated circuits integrated on its substrate.

The above mentioned objects can be accomplished by the present invention which provides a liquid crystal display device comprising: first and second substrates coated on the inner surface thereof with electrodes, at least one of said first and second substrates inlcuding an extended portion thereof which projects beyond the edge of the other of said substrates, a sealing member disposed around the periphery enclosing liquid crystal material and sealing between the substrates, input conductors disposed on the inner surface of said extended portion and electrically connected to said electrodes; a plurality of driving integrated circuit chips mounted on the inner surface of said extended portion and electrically connected to said input conductors, including a plurality of pairs of input temrinals thereof electriclly connected, one input terminal constituting each pair is arranged in the reverse order on one side of a reference line with respect the other constituting the pair on the other side of a reference line, metal film conductors formed on the inner surface of said extended portion and connecting said corresponding input terminals of said adjacent chips, a plurality of external contact terminals to an external apparatus, formed on the inner surface of said extended portion and electrically connected to input terminals of said chip.

DETAILED DESCRIPTION OF THE PREFERRED EMBODIMENTS

Figure 1:
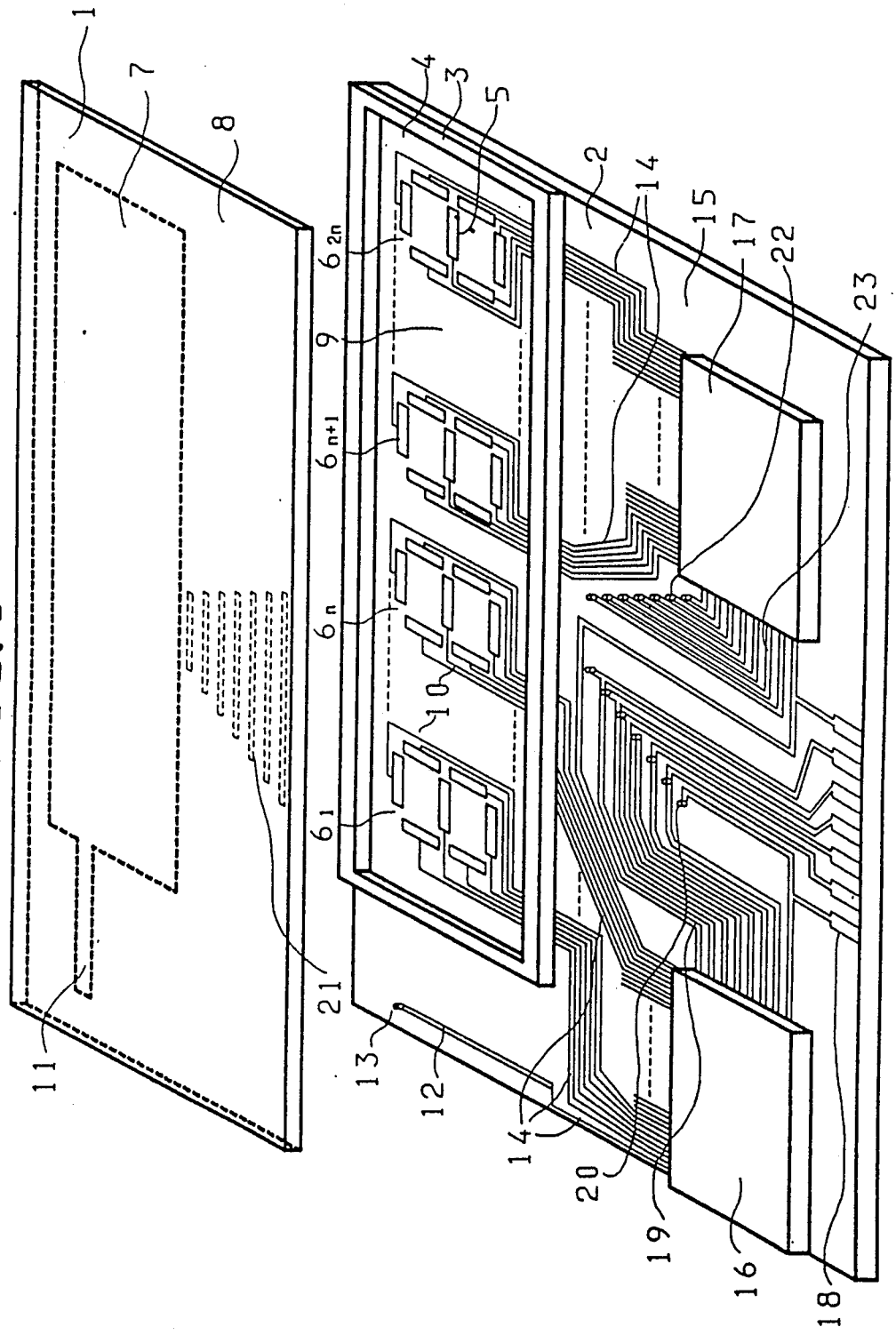
FIG. 1 is an exploded view of a prior art liquid crystal display device.
Figure 2:
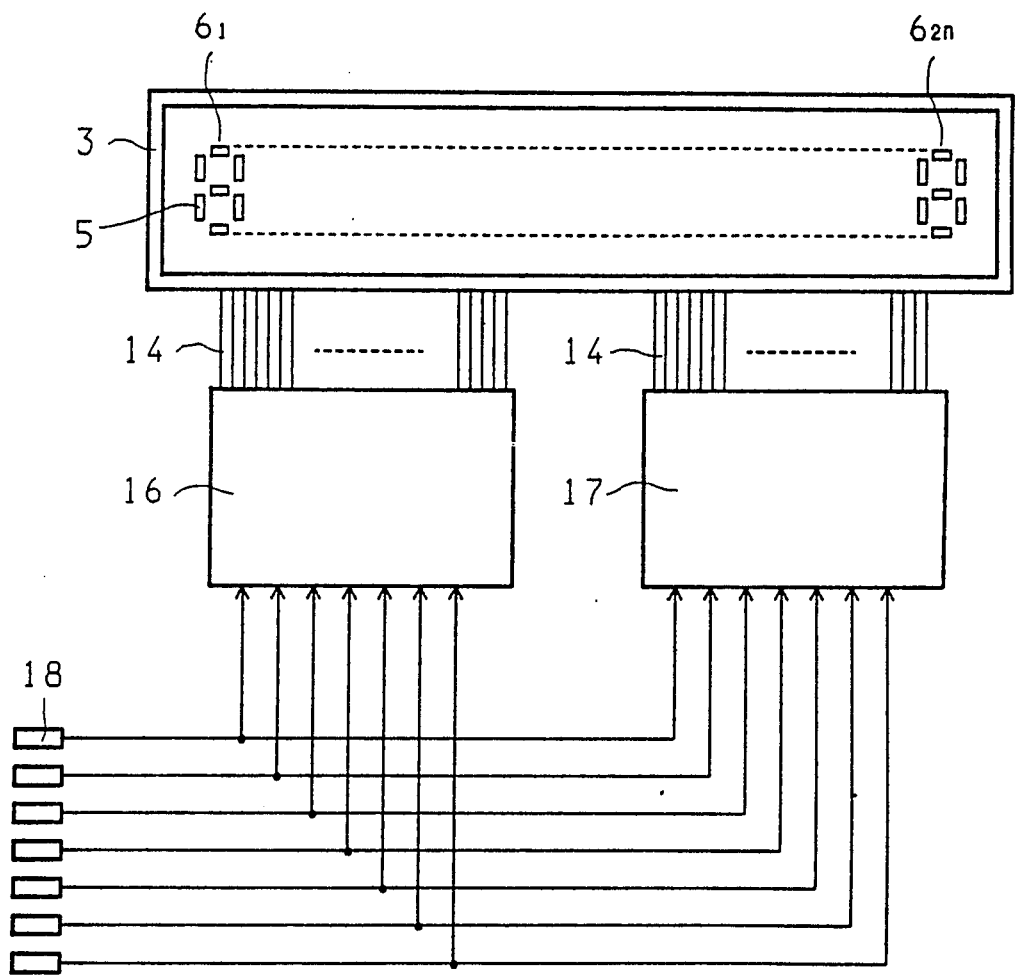
FIG. 2 is an example of wiring diagram of a liquid crystal display device with a large number of segment electrtodes.
Figure 3:
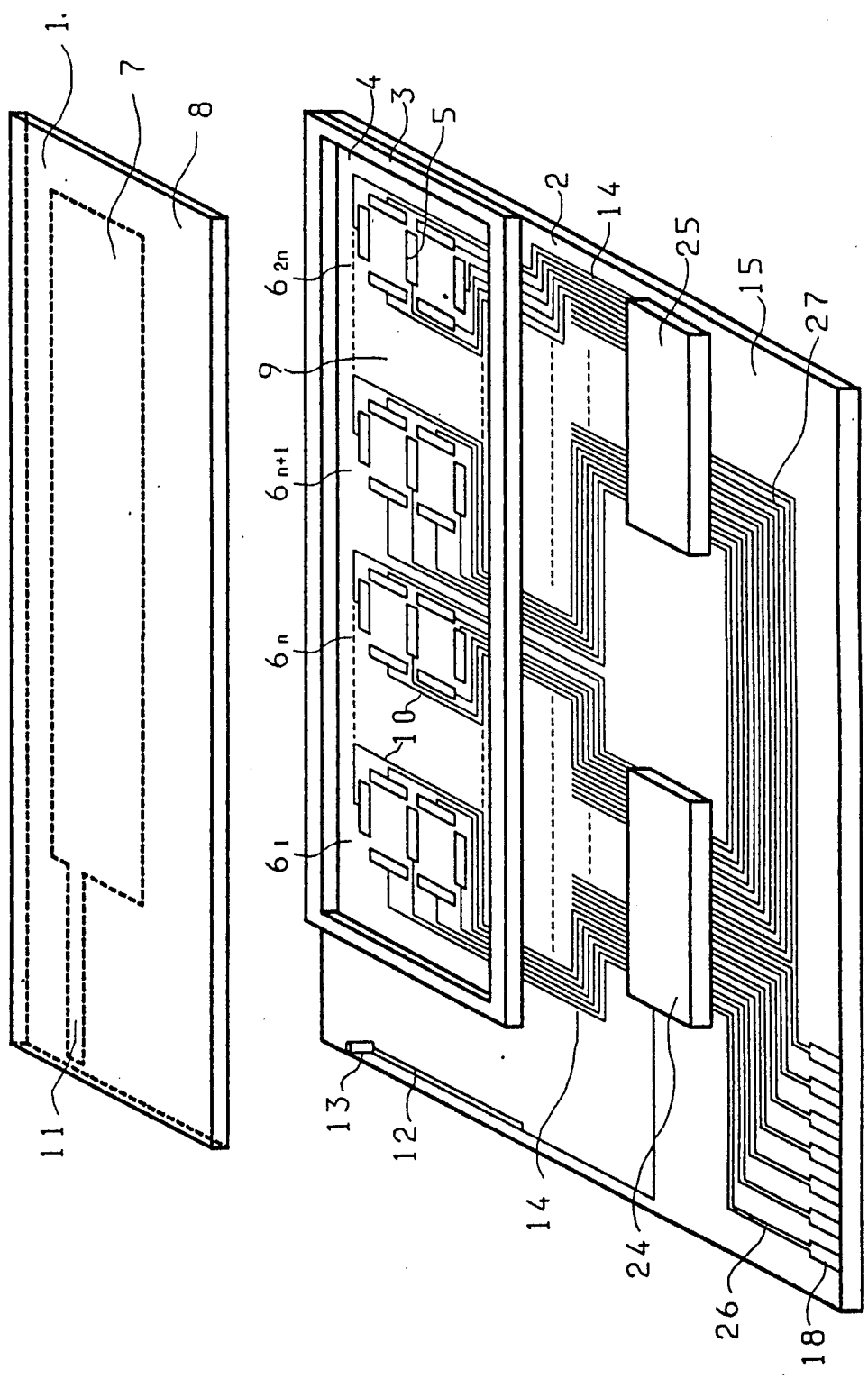
FIG. 3 is an exploded view of a first embodiment of the invention.
Figure 4:
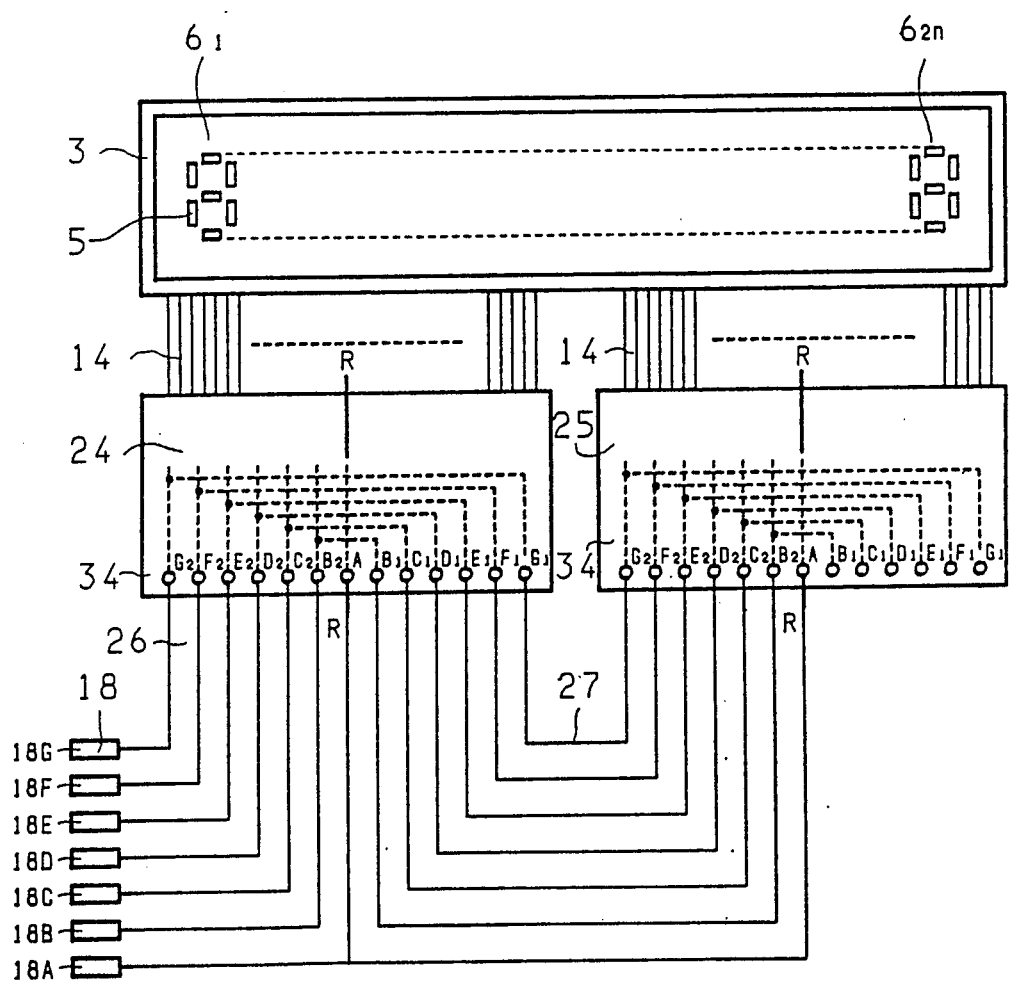
FIG. 4 is a wiring diagram of the embodiment in FIG. 3.

Referring now to FIGS. 3 to 9 wherein line reference characters designate identical or corresponding parts in FIG. 1, a plurality of liquid crystal driveing LSI chips 24, 25 are soldered on the substrate 2. As shown in FIG. 4, the input terminal 34 of LSI chips 24, 25 are arranged in the sequence of $B_1$, $C_1$, $D_1$, $E_1$, $F_1$, $G_1$ at the right side of the center input terminal A and in the reverse order as $G_2$, $F_2$, $E_2$, $D_2$, $C_2$, $B_2$ in the left side of the input terminal A. Moreover, the terminals $B_1$ and $B_2$, $C_1$ and $C_2$, $D_1$ and $D_2$, $E_1$ and $E_2$, $F_1$ and $F_2$, $G_1$ and $G_2$ which form pairs corresponding in both sides of the refrence line R—R passing the input temrinal A are internally connected as indicated by a dotted line within the chip and these pairs are also connected to the driving circuit formed within the chip. Therefore, the input signal to the driving LSI chip 24 is input to the driving circuit (not shown) formed on the LSI chip 24 through the wiring 26 formed by multilayer metal film and terminals A, $B_2$, $C_2$, $D_2$, $E_2$, $F_2$, $G_2$ of the LSI chip 24 from the external contact terminals 18A, 18B, 18C, 18D and 18E.. Meanwhile the input signal to the driving LSI chip 25 is input to the driving circuit (not shown) formed on the LSI chip 25 through the wiring 26, terminals A, $B_2$, $C_2$, $D_2$, $E_2$, $F_2$, $G_2$ of LSI chip 24, terminals A, $B_1$, $C_1$, $D_1$, $E_1$, $F_1$, $G_1$ of the LSI chip 24, wiring 27 formed by the multilayer metal film and the terminals A, $B_2$, $C_2$, $D_2$, $E_2$, $F_2$, $G_2$ of driving LSI chip 25 from the external contact terminals 18A, 18B, 18C, 18D, 18E and 18G. The chips and multilayer metal film are connected by wire bond or soldewr bump, but the present inventon can be adapted to any type of connecting system.

As explained above, in the present invention, since input wirings of a plurality of LSI chips 24 and 25 are carried out without using the conducting paste which raises wiring resistance, the input wiring resistance of LSI chips 24, 25 can be kept sufficiently low and reliability can be enahanced easily. This embodiment also provides significant effect for reducing the extenal size of a display apparatus and has saved the space as compared with the crossover system by about 15%.

Figure 5:
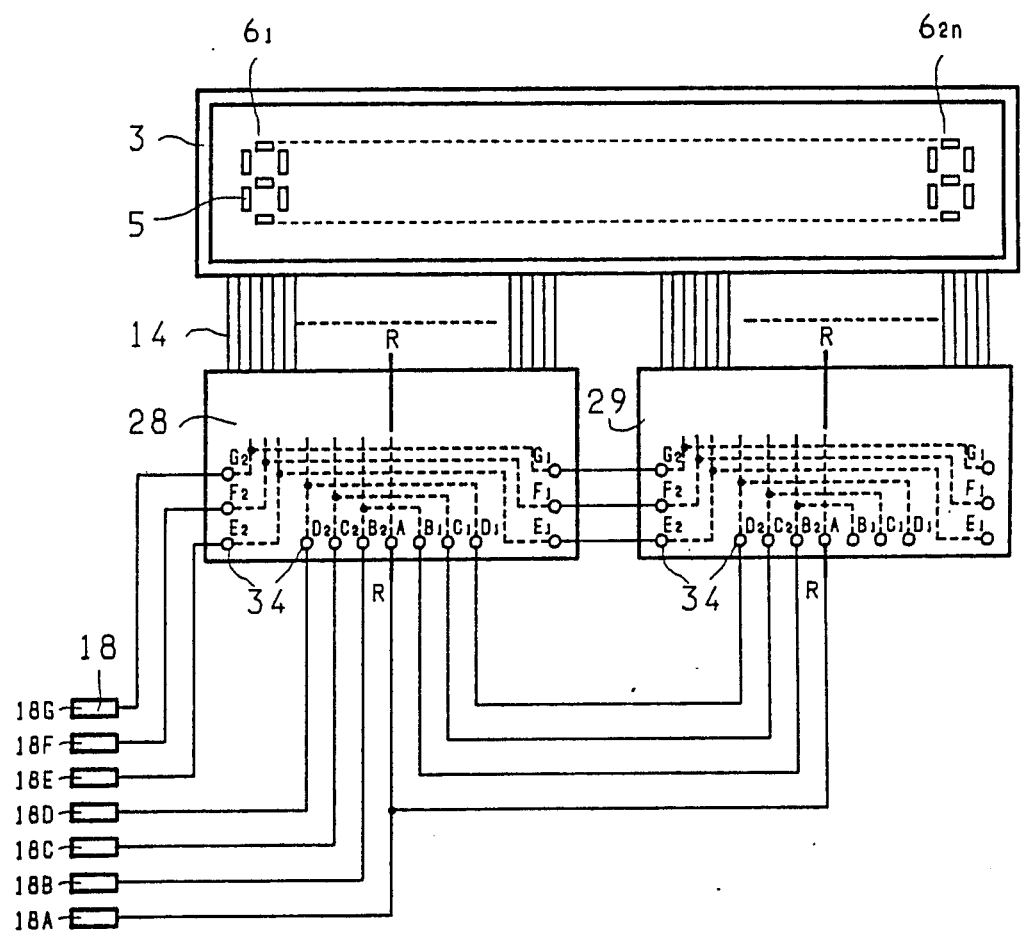
FIG. 5 is a schematic diagram of a second embodiment of the inention.

In above embodiment, the terminals A, $B_1$, $B_2$, $C_1$, $C_2$, $D_1$, $D_2$, $E_1$, $E_2$, $F_1$, $F_2$, $G_1$, $G_2$ of LSI chip are all arranged only at the one side of chip, but it is also possible to arrange them to a plurality of sides of the LSI chips 28, 29 as shwon in the second embodiment of FIG. 5.

In above first and second embodiments, two LSI chips are connected, but it is certainly possible to connect the inputs of the LSI chips even when three or more LSI chips are connected.

Figure 6:
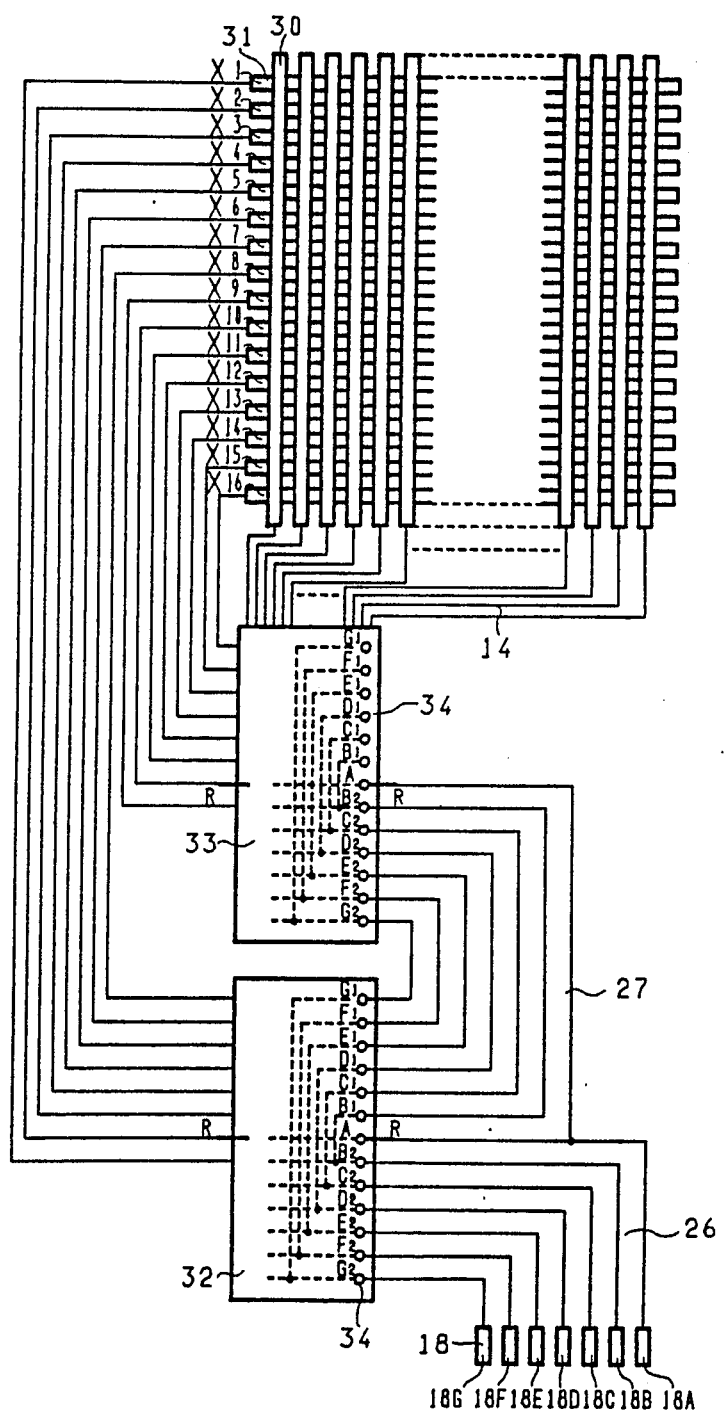
FIG. 6 is a schematic diagram of a third embodiment of the invention.
Figure 7:
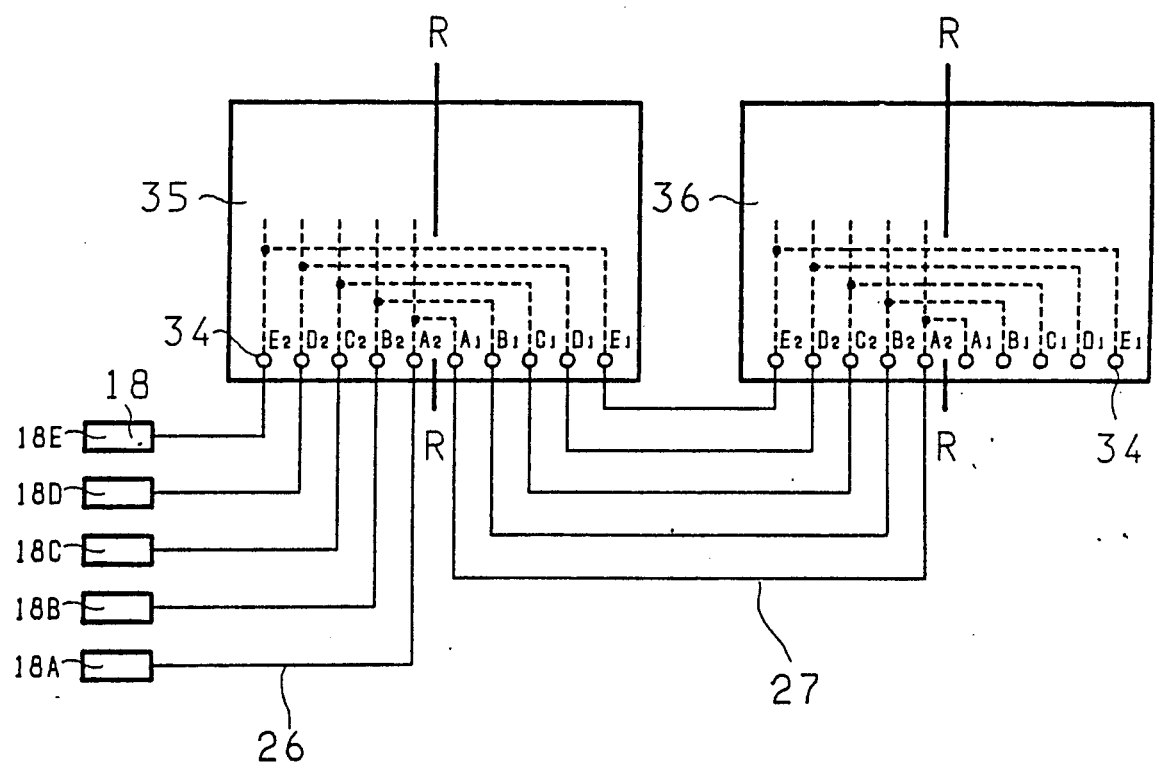
FIG. 7 is a schematic diagram of a fourth embodiment of the invention.

Moreover, in above embodiment, the static drive method is employed for commonly drive the segment electrodes 5 with the common electrode 7 but in the third embodiment shown in FIG. 6, the matrix display device, wherein the segment electrodes 30 and scanning electrodes 31 are formed by the striped elecrodes, is employed and a plurality of LSI chips are used for multiplexed driving of the scanning electrodes. The method of driving liquid crystal matrix display device is described in U.S. Pat. No. 3,976,362 to Kawakami. The scanning electrodes $X_1, X_2, \ldots, X_8$ are driven by the LSI chip 32, while the scanning electrodes $X_9, X_{10}, \ldots X_{16}$ by the LSI chip 33. The arrangement of A, $B_1$, $B_2$, $C_1$, $C_2$, $D_1$, $D_2$, $E_1$, $E_2$, $F_1$, $F_2$, $G_1$, $G_2$ of input terminals 34 of LSI chips 32,33 is the same as that of the LSI chips 24, 25.

As is apparent from above descripton, according to the present invention, each input terminal of LSI chip is formed as pair, a plurality of LSI chips are adjacently arranged on the one plane by reversely arranging the input terminals at the one side regarding the certain rerference line and the input terminals at the other side and the corresponding input terminals of adjacent LSI chips are wired and thereby crossover wirings of input wires can be eliminated even in case a plurality of signals are input in common to the input terminals of plurality of LSI chips. Said reference line R—R is not required to pass on the input terminals of LSI chip described in above embodiment and it may be set between the terminals $A_1$, $A_2$ of the LSI chips 35, 26 as shown in the fourth embodiment of FIG. 7.

Figure 8:
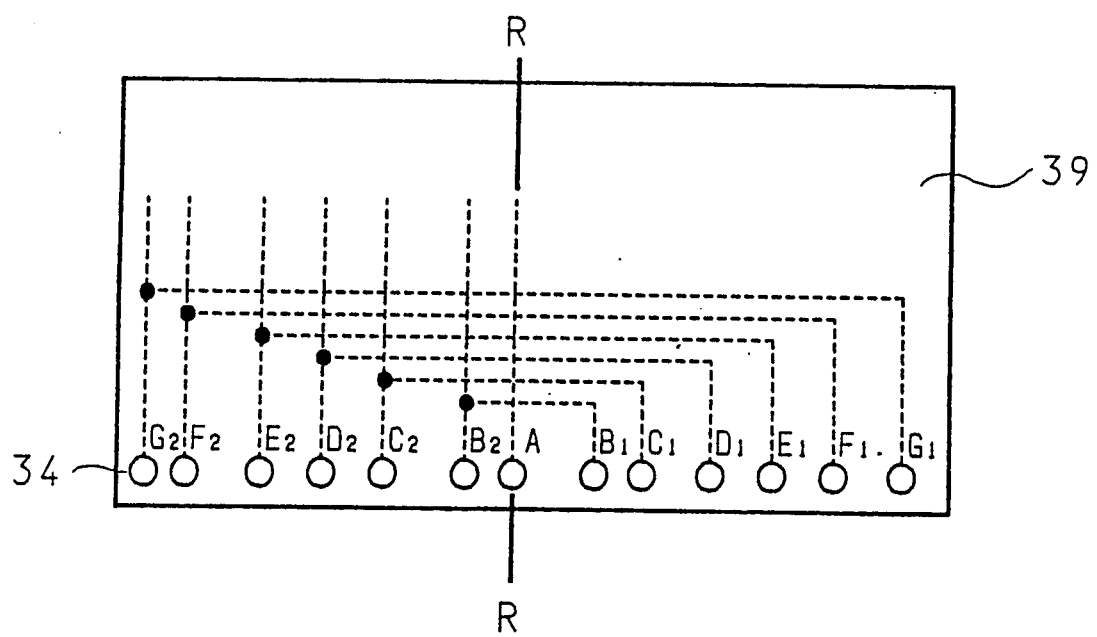
FIG. 8 is an arrangement of input terminals of an integrated circuit chip in a fifth embodiment of the invention.

As in the case of the fifth embodiment shown in FIG. 8, each pair of the terminals $B_1$ and $B_2$, $C_1$ and $C_2$, $D_1$ and $D_2$, $E_1$ and $E_2$, $F_1$ and $F_2$, $G_1$ and $G_2$ of the LSI chip may be arranged asymmetrically to the reference line R—R.

In above embodiments, all of the input terminals 34 of LSI chip are electrically connected to the driving circuit formed on the chip. However, as in the case of the sixth embodiment shown in FIG. 8, the signals inputted to the LSI chip 37 and the signals inputted to the LSI chip 38 are not all in common and these may partly different in some cases where the segment electrodes 30 is driven by the LSI chip 37, while the scanning electrodes 31 by the LSI chip 38. In this case, it is enough to excessively provide the pairs of internally connected input terminals as in the case of above embodiment, although not connected to the driving circuit formed on the LSI chip.

Figure 9:
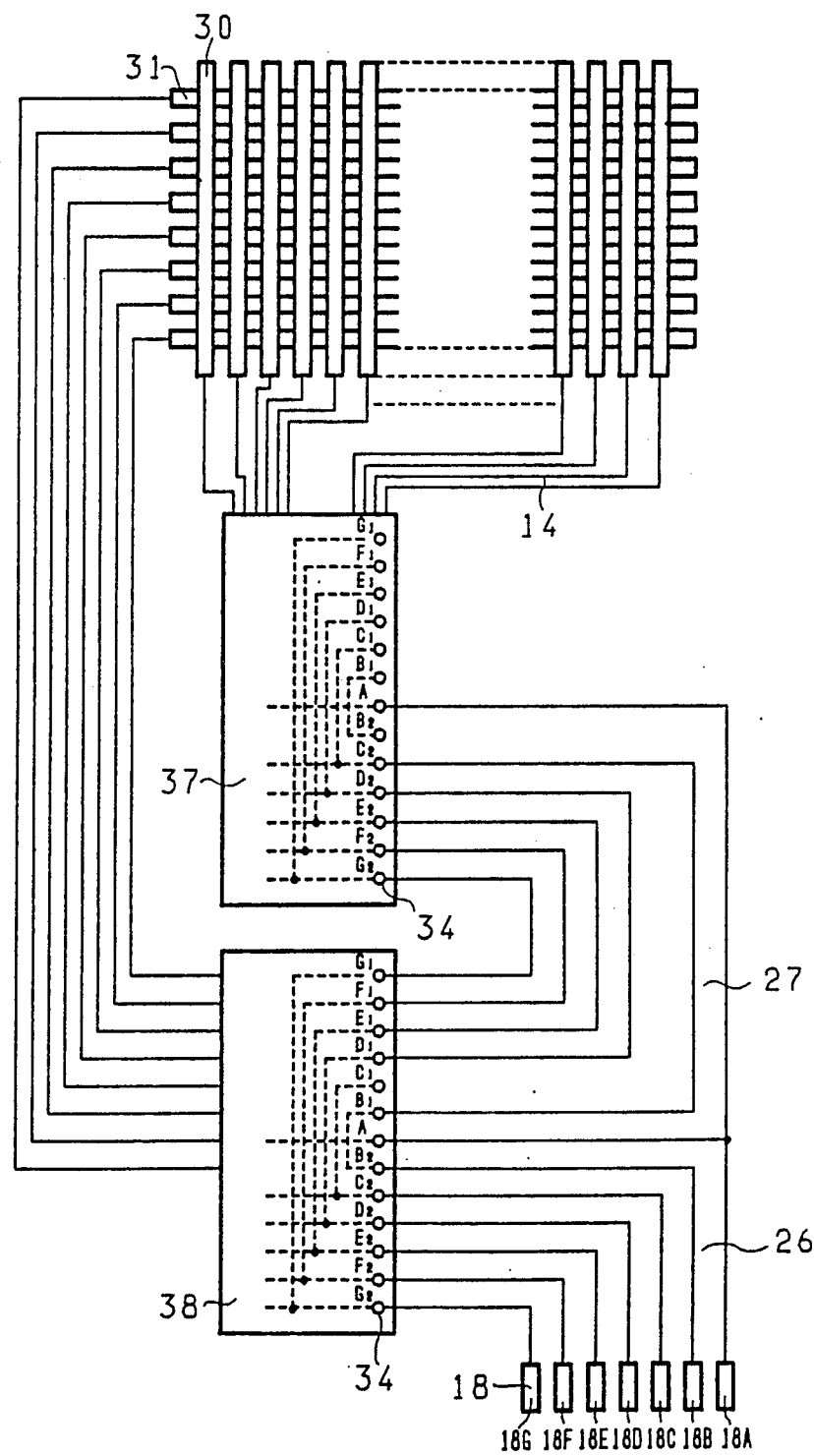
FIG. 9 is a schematic diagram of a sixth embodiment of the invention.

The pair of $B_1$ and $B_2$ among the input terminals 34 of LSI chips 37, 38 shown in FIG. 9 is not electrically connected to the driving circuit (not shown) formed on the LSI chip.

The signal which is common to both LSI chips is input to A, $D_1$, $D_2$, $E_1$, $E_2$, $F_1$, $F_2$, $G_1$, $G_2$ of the input temrinals 24 of the LSI chips 37, 38. In case it is required to input different signals for both LSI's, an signal is directly input to the terminals $C_1$, $C_2$ of the LSI chip 38 from the external contact terminal 18C and the different signal is input to the terminals $C_1$, $C_2$ of LSI chip 37 through the exernal contact terminal 18B and the terminals $B_2$, $B_1$ of LSI chip 38.

As described above, since a part of the input terminals is provided as the exclusive terminal for wirrings, diferent signals can be applied to the corresponding signal termianls of two LSI elements without crossover wiring at the single plane. Thereby, the wirings of LSI's for driving which are different in the clock signal, time multiplexing and bias voltage such as the scanning electride driving LSI chip and the segment electride driving LSI chip of the liquid crytal display apparatus can be realized easily, and accordingly the wiring pattern design period in the liquid crystal display apparatus can be curtailed and the process can also be simplified due to eliemination of crossover portions of wirings.

What is claimed is:

1. A liquid crystal display device comprising: first and second substrates coated on the inner surfaces thereof with electrodes, at least one of said first and second substates including an extended portion thereof which projects beyond the edge of the other of said substrates, a sealing member disposed around the periphery enclosing liquid crystal material and sealing between substrates, input conductors disposed on the inner surface of said extended portion and electrically connected to said electrodes, a plurality of driving integrated circuit chips mounted on the inner surface of said extended portion and eletrically connected to said input conductors, including a plurality of pairs of input terminals thereof electrically connected, one input terminal constituting each pair is arranged in the reverse order on one side of a reference line with respect to the other constituting the pair on the other side of a reference line, metal film conductors formed on the inner surface of said extended portion and connecting said corresponding input terminals of said adjacent chips, a plurality of external contact terminals to an external apparatus, formed on the inner surface of said extended portion and elecrically connected to input terminals of said chip.

2. A liquid crystal display device according to claim 1, wherein the driving integrated circuit chips include a plurality of integrated circuit chips for driving segment electrodes.

3. A liquid crystal display device according to claim 1, wherein the driving integrated circuit chips include a plurality of integrated circuit chips for driving scanning electrodes.

4. A liquid crystal display device according to claim 1, wherein said input terminals are arranged along a plurality of edges of said driving integrated circuit chips.

5. A ljquid crystal display device according to claim 1, wherein some of said pairs of input terminals are not electrically connected to driving integrated circuits formed on the chips on which the pairs of input terminals are formed, and are used for electrical connections for other adjacent chips.

* * * * *